United States Patent [19]

Baumeister

[11] Patent Number: 4,745,482
[45] Date of Patent: May 17, 1988

[54] ELECTRONIC RECORDER

[75] Inventor: Hans P. Baumeister, Churchville, N.Y.

[73] Assignee: Eastman Kodak Company, Rochester, N.Y.

[21] Appl. No.: 110,074

[22] Filed: Oct. 9, 1987

Related U.S. Application Data

[63] Continuation of Ser. No. 827,856, Feb. 10, 1986, abandoned.

[51] Int. Cl.⁴ .............................................. H04N 3/14
[52] U.S. Cl. ........................... 358/213.29; 358/213.26
[58] Field of Search ......... 358/213.23, 213.26–213.29, 358/212, 48, 11, 909

[56] References Cited

U.S. PATENT DOCUMENTS

| | | | |
|---|---|---|---|
| 4,322,752 | 3/1982 | Bixby | 358/213 |
| 4,330,796 | 5/1982 | Anagnostopoulos et al. | 358/213 |
| 4,339,775 | 7/1982 | Lemke et al. | 358/213 |
| 4,598,321 | 7/1986 | Elabd et al. | 358/213 |

Primary Examiner—Jin F. Ng
Assistant Examiner—Stephen Brinich
Attorney, Agent, or Firm—William F. Noval

[57] ABSTRACT

An electronic recorder is disclosed which includes an image sensor having a linear array of photosites. Means are provided for reading out the photosite array such that a plurality of blocks of photosites are read out in parallel, each block being comprised of a plurality of adjacent photosites read out in serial format to produce a plurality of parallel signals for each one-dimensional image sample, each parallel signal containing serial format information. Means are provided for reformatting the signals of a plurality of one dimensional image samples taken sequentially over a time interval into line sequential format suitable for video display to produce a visual record of the event along a time axis.

4 Claims, 3 Drawing Sheets

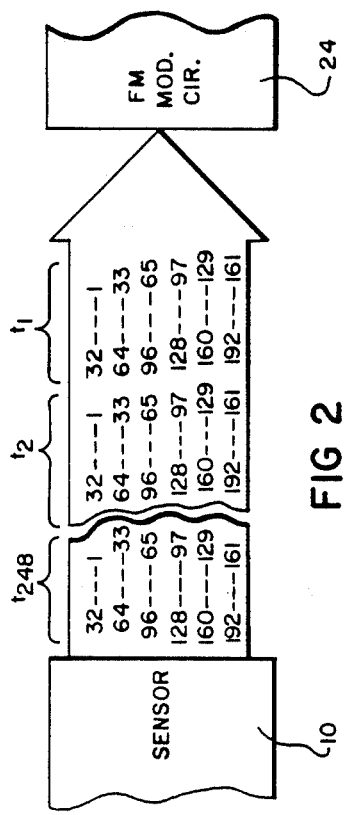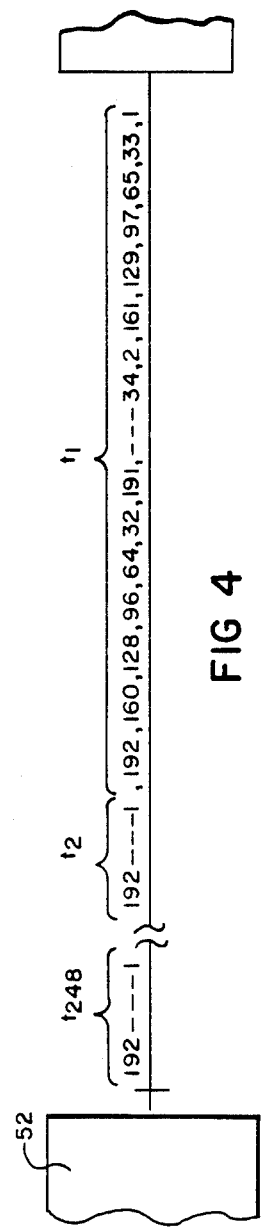

ELECTRONIC RECORDER

This is a continuation of application Ser. No. 827,856, filed Feb. 10, 1986, now abandoned.

BACKGROUND OF THE INVENTION

1. Field of the Invention

The present invention relates to high speed recording and adjacent display of a series of one dimensional image samples of an event taken sequentially during a predetermined time interval.

2. Description of the Prior Art

Events can be studied in several ways. Conventional still photographs capture a two dimensional image of an event in a single instant of time. By employing a succession of still images, an event can be analyzed in two spatial dimensions over a plurality of time increments (i.e., cine photography). To study fast moving events, slow motion photography employs high speed cameras and playback at reduced speeds. High speed photography would have more widespread applicability were it not for certain disadvantages. First, analysis of a transient event that occurs at an unknown time tends to be impractical because of the large amount of film that would be required. For example, were it necessary to operate a high speed photographic camera for one hour before the event occurs, approximately 60 miles of non-reusable photographic film would be required (assuming 16 mm film and a frame rate of 2,000 frames per second). Another disadvantage of photographic film is that it generally does not provide instant accessability of the image. Instead, it must be processed before viewing, a property that renders it unsuitable for applications wherein immediate analysis is required. Still another disadvantage of photographic film relates to the difficulty of computer analysis of data recorded thereon.

An alternative approach to photographic fast frame recording is the use of an electronic camera that includes a solid-state image sensor in combination with magnetic recording means. Such an electronic camera would possess extreme versatility, offering several advantages over the photographic system described above. For example, because magnetic recording media is reusable, it is cost effective even though used in large quantities. In addition, magnetic recording provides immediate playback and is more compatible with computer analysis.

Fast frame recording apparatus is known that combines the high resolution of a photographic film-based system with the versatility of an electronic camera. See, for example, *Research Disclosure*, Vol. 199, Publication No. 19919, November 1980, published by Industrial Opportunities Ltd., Homewell, Havant, Hampshire, P09 1EF, UK. Such fast frame recorder apparatus records scene information at a high frame rate and plays back the scene information at a slower frame rate for display on a video monitor, thereby producing a slow motion replay of the scene information. However, even the fastest electronic fast frame recorder is capable of only about 2,000 full frames per second or 12,000 partial frames per second (see U.S. Pat. No. 4,339,775; Lemke, July 13, 1982).

For some events, two dimensional spatial image sampling is not necessary, and it is sufficient only to display a series of one dimensional image samples taken sequentially during a predetermined time interval. Such events might for instance include those wherein one wishes to determine the lapse time between events at a plane. For example, the position of horses other than at the finish line is of no concern in a horse race finish, but the sequence of events at the finish line during an extended time period is of concern. One dimensional image sampling is also suitable when information is required of an object's motion in time along only a single spatial dimension, the record being usable much as a graph or chart from which information is gained regarding rate of object motion along that dimension.

There are two types of known cameras for making such records. One is a framing photographic camera which includes a rotating mirror to sweep a beam of light which is modulated in accordance with the image of an event across the surface of a sensitized film. In this camera, the film is exposed in successive steps or frames to produce a series of still pictures or exposures taken in rapid succession during the event. One example of such a camera is disclosed in U.S. Pat. No. 2,400,887 for "High Speed Motion-Picture Camera."

The other type of camera, referred to as a photographic streak camera, sweeps a focused beam over a film or moves the film relative to a beam of light. The resulting exposure is geometrically distorted image on the film.

Although framing and streak cameras have much higher sampling rates than conventional slow motion cine cameras, they still suffer the disadvantages mentioned above with triggering for events occurring randomly, non-reusable film, processing delays, and computer incompatibilities.

SUMMARY OF THE INVENTION

The recorder of the present invention is best suited for events wherein two dimensional spatial image sampling is not necessary, it being sufficient only to display a series of one dimensional image samples taken sequentially during a predetermined time interval.

The recorder according to the invention comprises a sensor having a linear array of photosites. Means are provided for reading out the photosite array such that a plurality of blocks of photosites are read out in parallel, each block being comprised of a plurality of adjacent photosites read out in serial format to produce a plurality of parallel signals for each image sample, each parallel signal containing serial format information. Means are provided for reformatting the signals of a plurality of one dimensional image samples, taken sequentially during the time interval, into line sequential format suitable for video display to produce a visual record of the event along a time axis.

Accordingly, the present invention provides a recorder having a greatly increased frame rate over that available with conventional electronic fast frame recorders of the type discussed above, without encountering the problems associated with high speed photography.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which:

FIG. 2 shows the format of signals produced at one stage within the recorder shown in FIG. 1;

FIG. 4 shows the format of signals produced at another stage within the recorder shown in FIG. 1.

DETAILED DESCRIPTION OF THE PREFERRED EMBODIMENT

Figure 1:
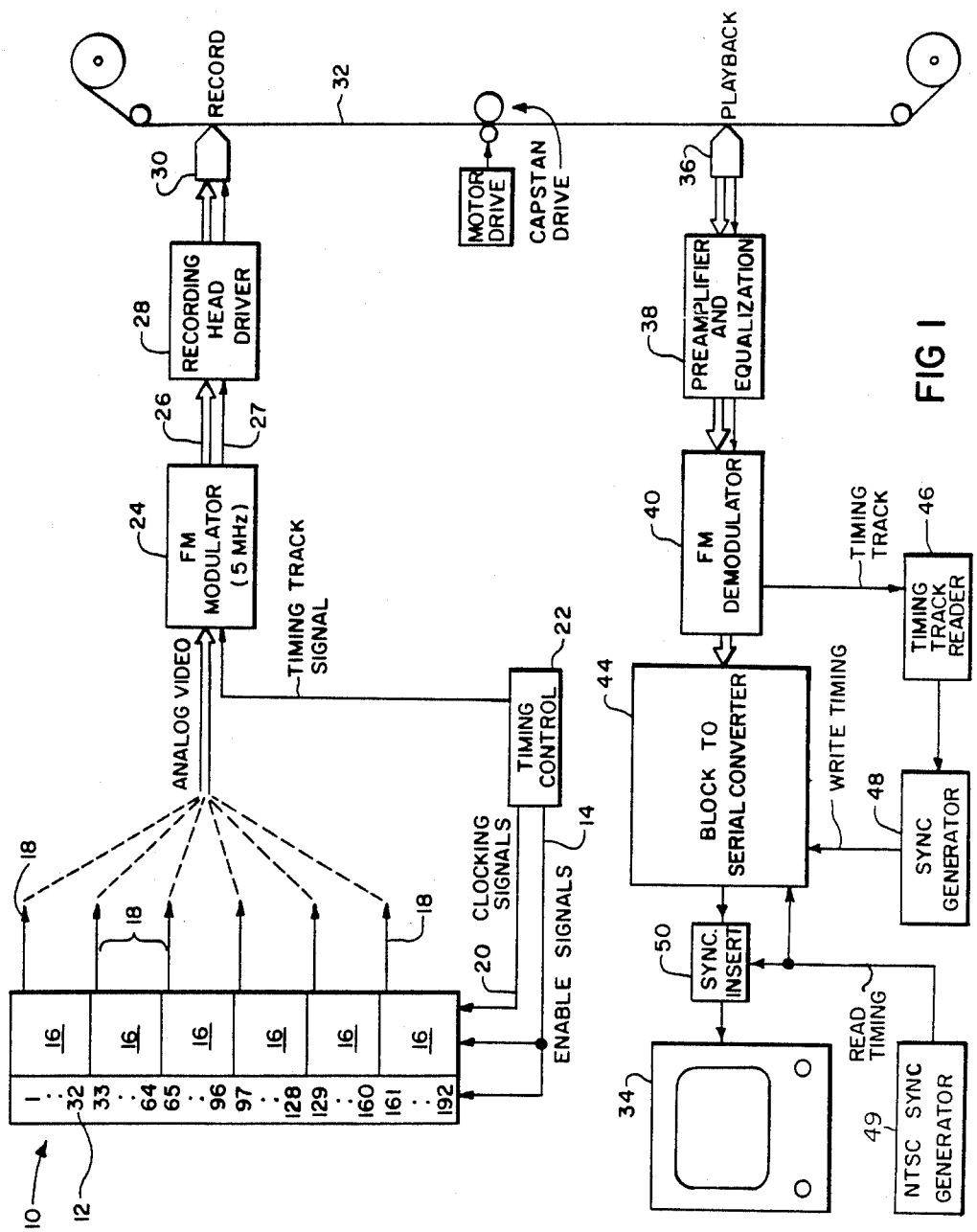
FIG. 1 is a functional block schematic diagram of an electronic streak recorder in accordance with the present invention.

Referring to FIG. 1, a solid state linear image sensor 10 is comprised of an array of say one hundred ninety-two charge-integrating photosites 12 (e.g., photocapacitors, photodiodes, etc.) arranged in a single column. Each photosite responds to incident radiation to provide a signal corresponding to one picture element (pixel) of image information.

Sensor 10 is a "block" readable, linear image sensor. The basic concept of block readout of a solid state image sensor is disclosed in U.S. Pat. No. 4,322,752 issued Mar. 30, 1982 to J. A. Bixby. For purposes of readout, sensor 10 is formatted into six blocks of thirty-two photosites each.

Upon the application of an enablement signal along control line 14, the accumulated charge at each photosite is shifted as an individual charge packet into its respective state of one of six parallel-in and serial-out CCD shift registers 16. Each of the six shift registers produces the stored information on its respective output 18 in serial format as clock pulses are applied at control line 20. The enabling and control signals are generated at timing control circuit 22.

After all thirty-two individual charge packets of each of the six shift registers 16 have been read out, an "enable" signal from timing control circuit 22 re-interrogates sensor 10 and allows parallel input, into the shift registers, of charge accumulated at the photosites during a second time interval $t_2$. This process is continually repeated during a predetermined time interval $t_1$ to $t_{248}$, and FIG. 2 shows the corresponding format of the signals produced by sensor 10 during two hundred forty-eight interrogations of the sensor.

The image information produced as described is in neither the parallel nor the serial line format discussed previously. Rather, the block information is arranged in parallel along the six shift register outputs 18; and each block contains thirty-two signals produced in series. By means of such a hybrid format, reduction in the time required for read out of sensor 10 is reduced by a factor equal to the number of blocks.

Again referring to FIG. 1, each of the six line signals that constitute the analog video signal from the camera, together with a timing track signal containing synchronization information, are frequency modulated in an FM modulator circuit 24 on a carrier having a suitable center frequency (such as 5 MHz). The output 26, 27 of FM modulator circuit 24 is, therefore, comprised of seven separate, frequency modulated signals (i.e., six video signals 26 and one timing signal 27).

Outputs 26 and 27 of FM modulator circuit 24 are applied to a recording head driver circuit 28 that drives a multi-channel longitudinal recorder that includes a seven channel magnetic recording head 30. The seven signals are recorded on seven separate tracks of a magnetic tape 32.

Having recorded information on magnetic tape 32 that corresponds to a plurality (say two hundred forty-eight) samples of the scene taken during a predetermined period of time, a video display of the scene is produced by playing back the information on a video monitor 34. A signal produced by a seven channel magnetic playback head 36 undergoes signal processing in a preamplifier and equalization circuit 38. The processed signal is then demodulated in an FM demodulator circuit 40.

After demodulation, the video signal, which is still in block format, is converted to a line sequential video signal by a block-to-serial converter circuit 44 (described below in detail). The demodulated timing signal, on the other hand, is diverted to a timing track reader circuit 46 that extracts the synchronization information to be used to control a synchronization generator circuit 48 that produces a "write" synchronization signal at its output. A read synchronization signal is derived from an NTSC synchronization generator 49 and is inserted into the line sequential video signal from converter circuit 44 by a circuit 50 to produce a standard NTSC format video signal, which is displayed on monitor 34. The displayed scene information will, as described above, consist of a still, two-dimensional replay of the object as it appeared at linear photosites 12 along a horizontal time axis extending from time $t_1$ to time $t_{248}$.

As discussed above, the signal produced upon playback is formatted in blocks, wherein each block contains thirty-two serial signals. Because conventional video monitors are not compatible with such a block format signal, a block-to-serial converter circuit 44 (FIG. 1) is used to convert the block format signal to a line sequential signal that is compatible with a standard video monitor (set up to accept a 192 line signal).

Figure 3:
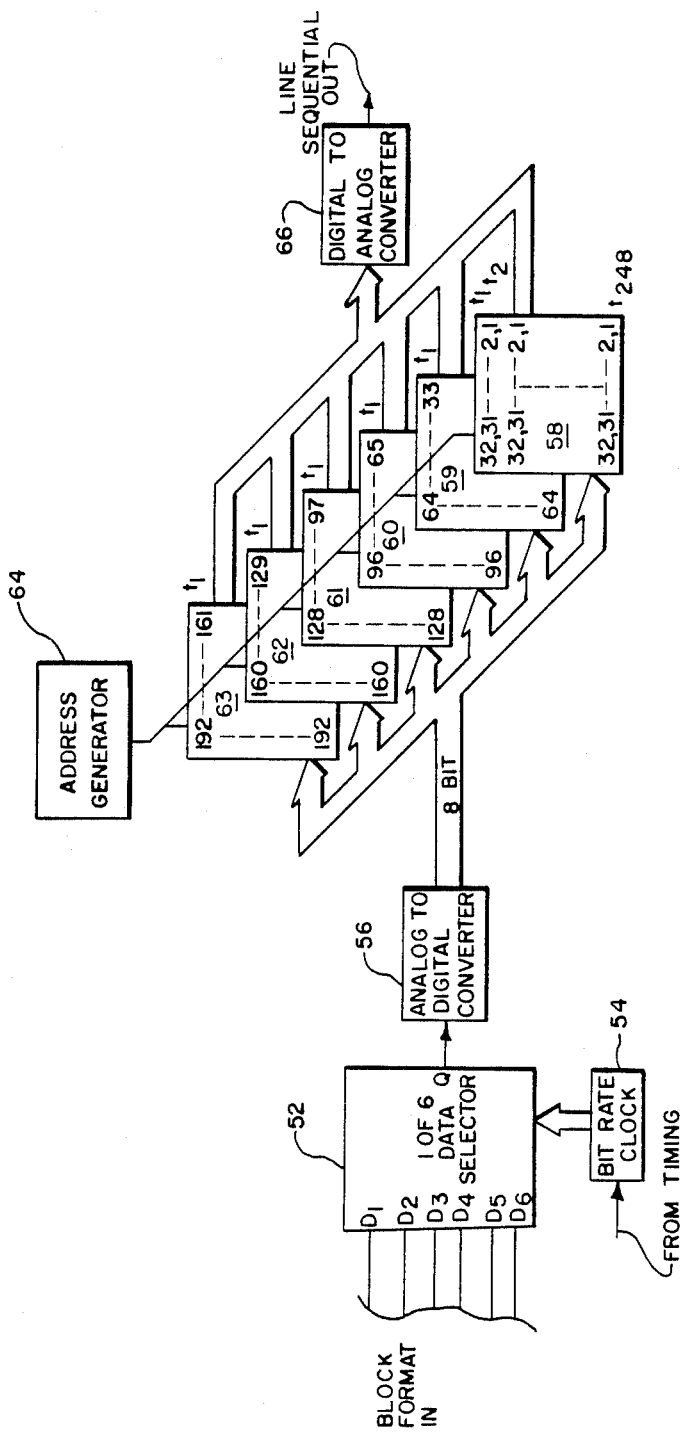
FIG. 3 is a functional block schematic diagram of a block to serial conversion circuit used in the recorder shown in FIG. 1.

Details of block-to-serial converter circuit 44 are shown in FIG. 3. The block format signal (formatted as in FIG. 2) is applied to the input data lines $D_1$ through $D_6$ of a 1-of-6 data selector 52. Operation of data selector 52 is controlled by a bit rate clock 54 that increments its count six times as fast as the pixel rate. Assuming initially therefore that the pixel information formatted as shown in FIG. 2 appears on the input data lines $D_1$ through $D_6$, respectively, data selector 52 sequentially routes the signal appearing on each input data line ($D_1$ through $D_6$) to the output data line Q at a rate (determined by bit rate clock 54) which is faster than the pixel rate of video information by a factor of six. The data selector thus samples all six input data lines before the pixel information corresponding to time $t_2$, (photosites 2, 32, 66, 98, 130, and 162) appears on the input data lines.

The output signal from the data selector is comprised of a series of analog information bits each of which corresponds to a different pixel of video information. In terms of the corresponding video information, the order of such information bits is as illustrated in FIG. 4.

The analog information bits are converted to their 8-bit binary equivalent by an analog-to-digital converter 56. The resulting stream of binary data is applied to the input data busses of six RAMs (Random Access Memories) 58–63, each of which is capable of storing the binary data corresponding to one block of video signals for two hundred forty-eight samples from time $t_1$ to time $t_{248}$. Because each block contains $248 \times 32 = 7,936$ pixels, $8k \times 8$-bit RAMs are used.

A write-and-read address generator 64 directs data into RAMs 58–63 such that each RAM stores data sequentially from one sensor block for all two hundred forty-eight time samples. Functionally, address generator 64 stores the first sample in RAM 58, the second sample in RAM 59, and so on until the sixth sample is stored in RAM 63. Then the process is repeated until all one hundred ninety-two samples for each of two hundred forty-eight time intervals have been stored.

During data read from memory, address generator 64 operates to cause data to be read from memory such that all two hundred forty-eight samples taken from photosite 1 (FIG. 1) are withdrawn, then all two hundred forty-eight samples from photosite 2, and so on until the final sample (photosite 192 at time $t_{248}$) is withdrawn. This is precisely the order of data that corresponds to a line sequential signal.

As information is read from RAMs 58-63, it is converted back to analog form by a digital to analog converter 66 to produce an analog line sequential output signal. This signal, after insertion of synchronization information (FIG. 1), is suitable for video display.

It can now be seen that the electronic recorder of the present invention provides for extremely rapid scene interrogation. Assume that the linear photosite array is clocked out at the standard NTSC visible line time of approximately 53 $\mu$sec., although other sampling frequencies are obviously possible and within the scope of the present invention. Since there are thirty-two photosites in each block in the preferred sensor embodiment, and since the blocks are read out in parallel, it is clear that the one dimensional image sample can be read in about 1.66 $\mu$sec. (53 $\mu$sec. ÷ 32). Assuming further that it takes 100 nsec. to shift data from photosites 12 into shift registers 16, total time resolution per image sample is about 1.76 sec. This is the equivalent of about 568,000 one-dimensional image samples per second, and represents a factor of 50 frame rate improvement over the 12,000 per sec. partial frame rate presently available with electronic fast frame recorders.

The invention has been described in detail with particular reference to certain preferred embodiments thereof, but it will be understood that variations and modifications can be effected within the spirt and scope of the invention. For example, the preferred embodiment has been described as including a sensor 10 with an array of one hundred ninety-two photosites and with the replay consisting of side-by-side viewing of two hundred forty-eight one-dimensional image samples. This results in a final image of 47,616 pixels. While such resolution is generally suitable for monochromatic images, color video images would require many more photosites in the sensor array. For example, good color reproduction can be obtained with arrays having one thousand twenty-four photosites divided into say thirty-two blocks of thirty-two photosites per block. If the replay consists of side-by-side viewing of five hundred twelve one-dimensional image samples, the final image would contain 524,288 pixels.

Another example of possible variations and modifications relates to the reformatting process. Reformatting can be done by frame store. The recorded signal is loaded into the frame store. Then, by changing the addressing algorithm, the image is read out in the required format for line sequential video display. Various imaging techniques would be possible; such as image rotation, image flip, zoom, crop, hold and compare by split screen, etc.

I claim:

1. An electronic recorder system comprising:
   a sensor for imaging a one-dimensional scene, said sensor having a single column of n×m photosites linearly arranged in n blocks of m photosites;
   means for simultaneously reading out each of said n blocks of photosites into respective n parallel-in and serial-out shift registers;
   means for serially reading out each of said n shift registers in parallel to produce n parallel video signals, each having m serial image samples;
   means for repeatedly reading out said sensor over T sequential time periods to produce a set of T time sequential, one-dimensional video images of said scene; and
   electronic display means for simultaneously displaying said set of T time sequential one-dimensional video images in an array of T columns of n×m image samples in each column.

2. The recorder system of claim 1, including means for recording said n parallel video signals in n tracks of magnetic tape such that said T time sequential video images of said scene are recorded sequentially in said n tracks on said tape.

3. The recorder system of claim 2, including means for playing back from said magnetic tape, n parallel video signals representing said T time sequential, one-dimensional video images of said scene; and means for converting said n parallel video signals for display on said display means as a simultaneous array of T columns of n×m image samples.

4. The recorder system of claim 3 wherein said converting means includes:
   a set of n memories;
   means for storing each of said n video signals in a respective one of said set of n memories;
   means for sequentially reading out from said set of n memories all T image samples taken from each photosite of said sensor, each set of T image samples constituting a horizontal line displayed on said display means.

* * * * *